Aug. 6, 1929.  G. T. VOORHEES  1,723,100
PISTON APPARATUS
Filed Oct. 7, 1921
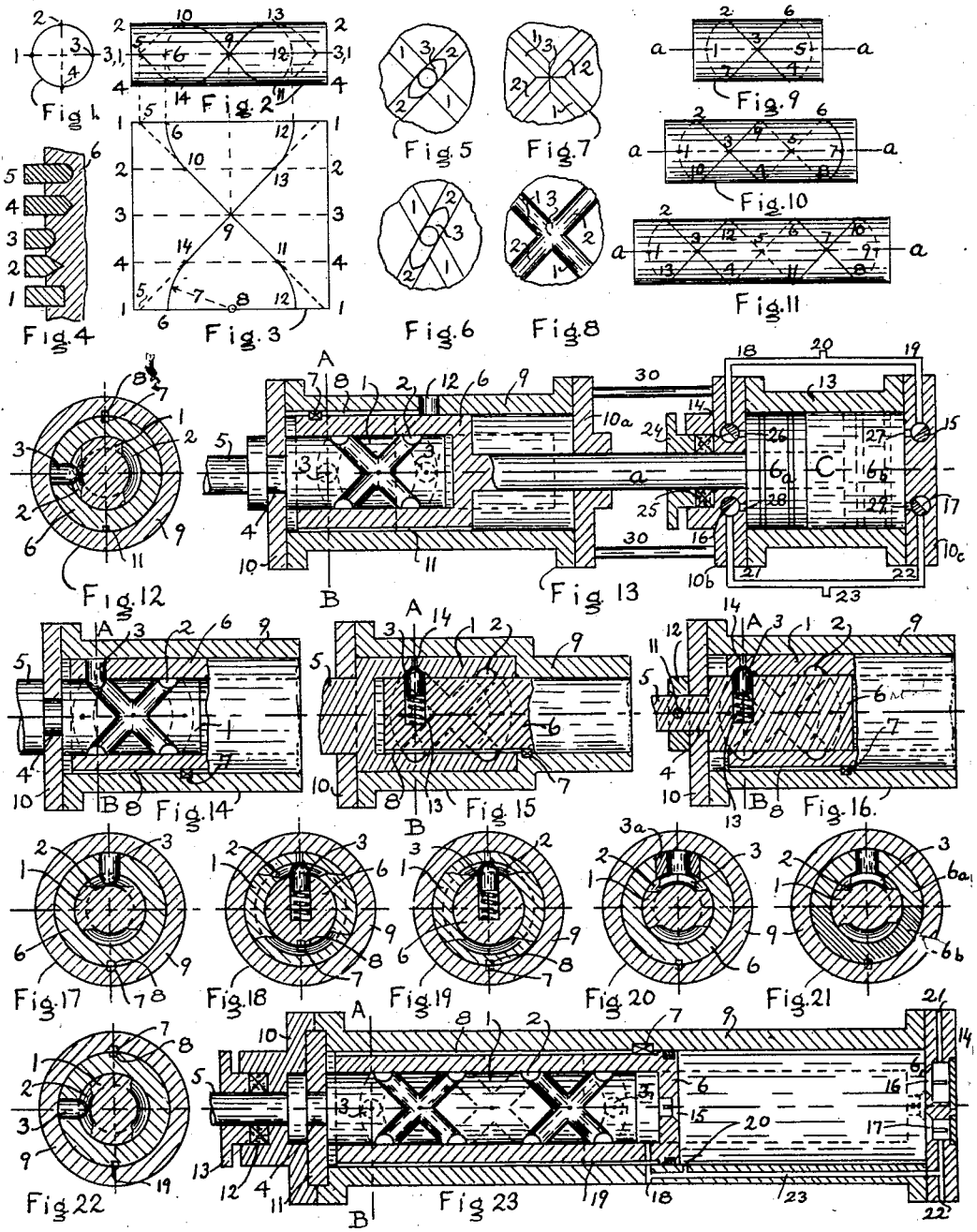
WITNESSES
INVENTOR.
Gardner Tufts Voorhees Patented Aug. 6, 1929.

1,723,100

UNITED STATES PATENT OFFICE.

GARDNER TUFTS VOORHEES, OF BOSTON, MASSACHUSETTS.

PISTON APPARATUS.

Application filed October 7, 1921. Serial No. 506,022.

My invention relates to the transformation of rotary into reciprocating motion or vice-versa, particularly where the reciprocating motion is the piston of a compressor or of a vapor or gas engine. I accomplish this through a combination of a piston and its cylinder with a right and left handed continuous helix and a traveller and other means. Through this invention I obviate the use of connecting rods, cranks, and cross-heads and am enabled to make a much more compact, simple, and efficient apparatus than that heretofore used and am enabled to convert high speed rotation into low speed reciprocations, or vice-versa, without the use of cumbersome, inefficient and bulky intermediate reducing means such as belts, chains and gears. I am also enabled to make a very long stroke in a very compact apparatus and such long strokes are particularly valuable in the compressor of a refrigerating machine because of minimizing of the effect of clearance and getting a very much better jacketing effect than is otherwise possible.

In the drawings Fig. 1 is an end and Fig. 2 a side view of a cylinder and Fig. 3 a development of the cylinder's surface. Fig. 4 is a sectional view of various shapes of grooves and travellers. Figs. 5, 6, 7, 8 are views of crossings of grooves, Figs. 9, 10, 11 are side views of cylinders, diagrammatically showing a groove thereon. Fig. 12 is a cross section on line A B of Fig. 13 and Fig. 13 is a longitudinal diagrammatic sectional view of one form of my invention. Figs. 14, 15 16 are longitudinal, diagrammatic sectional views of modifications of a part of my invention. Fig. 17 is a cross sectional view of Fig. 14 on line A B. Fig. 18 is a cross sectional view of Fig. 15 on line A B. Fig. 19 is a cross sectional view of Fig. 16 on line A B. Figs. 20, 21 are cross sectional views showing details of part of my invention Fig. 22 is a cross sectional view on line A B of Fig. 23. Fig. 23 is a horizontal diagrammatical sectional view of one form of my invention.

In Fig. 3 a line 6, 10, 9, 11, 12, 13, 9, 14, 6 can be drawn on the development of the surface of the cylinder shown in Figs. 1 and 2. In Fig. 3 lines 1, 1, 2, 2, 3, 3, 4, 4 correspond to similar lines on Figs. 1 and 2. These lines are ¼ of a revolution apart. Lines 10, 11 and 13, 14 cross at right angles at 9. Lines 10, 11 and 13, 14 can extend to 5 or can have curved extensions as 6—10, 14—6, 12—13, 11—12. Here these curves have a center as at 8 and a radius as 7 so that the curves as 6, 14 cross lines 1, 1 as at 6, at right angles, and are tangent to line 13, 14 at 14. Line 6, 10, 11, 12 could be a right handed thread or groove and line 12, 13, 14, 6 a left handed thread or groove. In Fig. 2 starting at point 6, a point following the line 6, 10, 9, 11, 12, 13, 9, 14, 6 would have revolved twice around an axis of the cylinder and would have reciprocated from 6 to 12 and back again from 12 to 6. It is noticed that the right and left handed threads cross each other at 9 and join each other at 6 and 12. The use of curves as 6, 14 makes the change from right to left hand threads easier and not abrupt as would be the case if the right and left hand threads joined without such curves as at 5. The line or thread can have any desired shape with a follower or traveller to fit it and to engage it.

In Fig. 4 the piece 6 is shown as having several shapes of grooves and followers, 1, which is square, 2, which is V shaped, 3, which is a half circle, 4, which has flat sides and a V shaped bottom and 5, which has flat sides and a half round bottom.

In Fig. 5 the grooves 1, 1 and 2, 2 cross at right angles and allow a shorter traveller 3, that will properly go over a crossing than if the grooves crossed at other than a right angle as in Fig. 6. If the bottom of the grooves are V shaped like Fig. 7 as for traveller 2 or 4 of Fig. 4 then the bottom of the groove helps as a guide at the crossing 3. Somewhat similar effects are obtained by a groove with a curved bottom as shown in Fig. 8 which is similar to the groove shown at 3 or 5 in Fig. 4. In Figs. 9, 10, 11 each cylinder has a thread, if the thread of each is followed from 1 back to 1, right handedly, a point on Fig. 9 will reciprocate from 1 to 5 and back to 1 while it makes two revolutions around the cylinder's axis $a\ a$, the point progressing as follows 1, 2, 3, 4, 5, 6, 3, 7, 1. Similarly in Fig. 10 a point would reciprocate from 1 to 7 and back to 1 and revolve 3 times about axis $a, a$ and in Fig. 11 the point would reciprocate from 1 to 9 and back to 1 while it revolved four times around the cylinder's axis $a\,a$. Similarly from one to any number of revolutions could be made by a point following a similar groove without any or with one or more crossing points while the point reciprocates from one to the other end of the groove and back to its starting point. In Figs. 14, 15, 16, 1 is a cylinder having a groove 2 and a follower 3. These three figures show 3 different modifications of the method of converting a rotary motion to a reciprocating motion or vice versa. In Fig. 14 cylinder 1 having outer groove 2 is free to revolve but cannot reciprocate because of collar 4 and the follower 3 is in reciprocating piece 6 free to reciprocate but prevented from rotation by key 7 and keyway 8 and is guided in cylinder 9. So that the rotation of shaft 5 will reciprocate piece 6 or the reciprocation of piece 6 will rotate shaft 5. Shaft 5 could have a fly wheel, not shown.

Fig. 17 is a cross section of Fig. 14 on line A B. In Fig. 15 cylinder 1 has inner groove 2 and is free to revolve but cannot reciprocate because of collar effect of cylinder 9 and its head 10, the follower 3 is in reciprocating piece 6 free to reciprocate but prevented from rotating by key 7 and key way 8 and is guided in cylinder 9. So that the rotation of shaft 5 will reciprocate piece 6 or the reciprocation of piece 6 will rotate shaft 5. Fig. 18 is a cross section of Fig. 15 on line A B. In Fig. 16 cylinder 1 has inner groove 2 and is free to reciprocate in guide cylinder 9 but is prevented from revolving by key 7 and key way 8, piece 6 has collar 3 and is free to revolve but is prevented from reciprocating by collar 4. So that the rotation of shaft 5 reciprocates piece 1 or the reciprocation of piece 1 will rotate shaft 5. Fig. 19 is a cross section of Fig. 16 on line A B. For constructional purposes head 10 of Fig. 14 is in halves to fit into collar 4. In Fig. 16, 11 is a pin to hold piece 12 on shaft 5. In Figs. 15 and 16 follower 3 has spring 13 to push it into groove 2 and piece 1 has hole 14 through which to push down follower 3 so as to slide piece 6 out of piece 1. If a long follower like that of 3 of Figs. 5 and 6 would be used it might for structural reasons, be provided with cylindrical bushing $3^a$ as in Fig. 20 or the piece containing follower 3 may be halved as $6^a$ and $6^b$ in Fig. 21. Piece 6 of Figs. 14 or 15 or piece 1 of Fig. 16 may be connected to or form a continuation of a piston. So that the piston may be reciprocated by the revolution of shaft 5, or so that shaft 5 may be rotated by the reciprocation of the piston.

Fig. 13 is in part like Fig. 14, Fig. 12 being a cross sectional view on line A B of Fig. 13. Here shaft 5 having collar 4 rotates cylinder 1 having groove 2 so that traveller 3 reciprocates piece 6 held by key 7 in key way 8, oiled through hole 12, groove 11 communicates to each end of piece 6. One revolution of shaft 5 moves follower from 3 to $3_1$ and another revolution of shaft 5 moves follower from $3_1$ to 3. Piece 6 has piston rod $a$ attached to piston $6^a$ in cylinder 13. Cylinder C has valves of any desired type as 14, 15, 16, 17. One revolution of shaft 5 moves piston from $6^a$ to $6^b$ or a movement of piston from $6^a$ to $6^b$ revolves shaft 5 one revolution. Shaft 5 may have a fly wheel, not shown. 24 is a gland, 25 packing, 26, 27, 28, 29 ports for cylinder C, 30 distance pieces. Here it is evident that the rotative power applied to shaft 5 from any desired source may reciprocate piston $6^a$ for any desired purpose or if piston $6^a$ is reciprocated by any desired force then rotative power from shaft 5 may be used for any desired purpose. Cylinder C and piston $6^a$ may be of a steam or gas engine or of any other vapor engine or may be of a compressor to compress any gas or vapor for any desired purpose. Cylinder C can be for a single acting or a double acting compressor for a refrigerating machine. If for a double acting compressor suction may be via pipe 20 and branches 18, 19 via suction valves 14, 15 and ports 26, 27 and discharge through ports 28, 29 and discharge valves 16, 17 at branches 21, 22 and pipe 23, or if C were a single acting compressor valves 14, 16 could be dispensed with and port 28 closed up. If C were used as a gas engine any necessary extra valve and ports not shown may be added as will be clear to those skilled in the art. In Fig. 22 which is a cross section of Fig. 23 on line A B and in Fig. 23 which is a longitudinal section, I show a compressor as of a refrigerating machine or for any other desired purpose, its operation is as follows: Shaft 5 is rotated by any desired means and is a part of piece 1 having groove 2 and collar 4 with split piece 11 between head 10 and cylinder 9, head 10 having packing 12 and gland 13. 6 is a piston having follower 3 and provided with key 7 and key way 8. Two revolutions of shaft 5 will move follower 3 to $3_1$ and so reciprocate piston 6 to $6_1$ and two more revolutions will move follower from $3_1$ to 3 and so reciprocate piston from $6_1$ to 6.

There may be suction valves 15, 17 or suction port 20 or all and discharge valve 16. Suction vapor may enter through 18 or 22 or both 18 and 22 may be connected by passage 23, 19 being a combined feed and equalizing passage. The reciprocation of the piston will draw in low pressure vapor as from a refrigerator, not shown, via 18 or 22 or both through a suction valve or port and will compress and discharge it via discharge valve and 21 to a condenser, not shown, as will be clear to those skilled in the art without further description. Multiple threads and travellers and special forms of groove and traveller and special bearings may be used to reduce frictional losses as will also be clear to those skilled in the art without further detailed description.

I claim:

The combination of a main cylinder having gas or vapor outlet and inlet means, a piston therein, a key and key-way between said main cylinder and piston, a traveler in said piston, a cam cylinder in said main cylinder having a helical cam groove therein adapted to engage said traveler, said cam cylinder having a collar thereon engaged in said main cylinder, said cam cylinder having a shaft extending therefrom through an end of said main cylinder and a stuffing box for said shaft.

GARDNER TUFTS VOORHEES.